United States Patent [19]

Fukuyama

[11] Patent Number: 4,596,473
[45] Date of Patent: Jun. 24, 1986

[54] FOIL BEARING
[75] Inventor: Hiromasa Fukuyama, Ebina, Japan
[73] Assignee: Nippon Seiko Kabushiki Kaisha, Tokyo, Japan
[21] Appl. No.: 612,073
[22] Filed: May 21, 1984
[30] Foreign Application Priority Data
    May 23, 1983 [JP] Japan .................. 58-77411[U]
[51] Int. Cl.⁴ .................................. F16C 32/06
[52] U.S. Cl. .................................. 384/103
[58] Field of Search ............. 384/103, 104, 100, 120,
        384/106, 105, 125; 180/164, 116, 119, 122, 123,
                                                124, 125

[56]           References Cited
        U.S. PATENT DOCUMENTS 3,434,761  3/1969  Marley .................. 384/103
    3,520,578  7/1970  Licht ................... 384/104
    3,765,732 10/1973  Watt .................... 384/104
    3,827,766  8/1974  Watt .................... 384/104

Primary Examiner—Stuart S. Levy
Assistant Examiner—Lynn M. Sohacki
Attorney, Agent, or Firm—Basile Weintraub Hanlon

[57]                ABSTRACT

A pair of relief portions have been provided in a metal foil bearing so as to prevent the metal foil from contacting with the surface of the rotary shaft of the bearing during its high speed rotation. A relief portion is provided either at (1) both the axial ends of the metal foil, (2) on the outer surface of the rotary shaft at the position corresponding to the axial end of the metal foil, or (3) on the outer surface of the rotary shaft at a position further in than the portion corresponding to the axial end of the metal foil and axially extending therefrom up to the axial end of the rotary shaft.

8 Claims, 4 Drawing Figures

FOIL BEARING

BACKGROUND OF THE INVENTION

1. Field of the Invention

This invention relates to a foil bearing. More particularly, this invention concerns a foil bearing wherein undesirable metal to metal contact between the metal foil and the rotary shaft of the foil bearing, during the high speed rotation of the rotary shaft is prevented from occurring. Even more particularly, the present invention concerns foil bearings having a pair of relief portions on both ends of the metal foil in the direction of the axis of the rotary shaft, or on the positions of the rotary shaft corresponding to said ends of the metal foil or on the two opposite portions on the outer surface of the rotary shaft each starting from the point further in than the position corresponding to each end of the metal foil up to the outer axial end of the rotary shaft.

2. Prior Art

Heretofore, foil bearings as radial gas-containing bearings have been known. This type of foil bearing is constructed in such a manner that the rotary shaft of the bearing is wrapped by a flexible metal foil of aluminum or stainless steel, etc., such that the pressure of a gas layer formed between the thin foil and the rotary shaft can support the rotary shaft.

It is an indispensable requisite in this type of foil bearing to maintain the bearing clearance between the metal foil and the rotary shaft constant, even when the rotary shaft rotates at a very high speed, to ensure complete lack of contact between said two mating parts.

However, it is very difficult, in the actual fabrication process, to finish each of the metal foils with perfectly uniform smoothness over the entirety of their bearing surface. Accordingly, some defects such as burr, warping or waved surfaces are liable to be caused on both axial ends, or at the margins of the cut metal foil.

Assembled foil bearings using metal foils having such defects are liable to cause undesirable metal-to-metal contact during high speed rotation between the metal foil and the rotary shaft. Thus, it becomes difficult or impossible to assure perfect non-contact over the entire surface of the metal foil.

As a pressure characteristic of the gas layer in the bearing clearance defined between the metal foil and the rotary shaft, the pressure distribution curve along the axis of the shaft takes the form of a relatively smooth arcuate shape when only a small extent of bearing load is applied to a foil bearing having large bearing clearance. Because of the small load there will not be an appreciable amount of excessive pressure even at the axially middle portion of the bearing.

On the other hand, when a large extent of bearing load is applied to a foil bearing having a small bearing clearance, the pressure distribution curve of the bearing will take an arcuate shape having sharp curvature resulting in excessive pressure at the middle part of the bearing, along the axis of the rotary shaft.

As explained above, if a large extent of a load is applied to a foil bearing having small clearance, when the bearing is operated at high speed of rotation, the middle portion of the metal foil of the bearing along the bearing axis is subjected to a large extent of gas layer pressure and will expand and deform radially outwardly, resulting in contacting of the metal foil at both axial ends with the rotary shaft. This invention aims to obviate the problems as explained above.

SUMMARY OF THE INVENTION

The present invention, as subsequently detailed, avoids any undesirable contact between the metal foil and the rotary shaft which is attributable to the foil fabrication and to the characteristics of the gas layer in the foil bearing, and which is useful for a high speed gas layer bearing.

According to the present invention, the rotary shaft of a foil bearing is wrapped around its outer surface by a flexible metal foil, such that the rotary shaft is supported by a gas layer formed between the metal foil and the rotary shaft.

In addition, a pair of relief portions for avoiding metal-to-metal contact between the metal foil and the rotary shaft is provided. The relief portions can be provided at either (1) the opposing axial marginal ends of the metal foil or a bearing surface (2) on the portions of the rotary shaft corresponding to the axial marginal ends of the metal foil as a bearing surface or, (3) on the portions of the outer surface or the rotary shaft. Each relief portion starts from a point slightly inner than the point corresponding to the respective, axial end of the metal foil as a bearing surface and extends up to the axial end of the shaft.

Thus, the device of the present invention is constructed to have a pair of relief portions for preventing the metal foil from contacting the rotary shaft, the relief portions being either on both axial marginal ends of the flexible metal foil as a bearing surface; on the portion of the outer surface of the rotary shaft corresponding to the both axial ends of the metal foil, or on the outer surface of the rotary shaft. Each of the relief portions starts from a point inner than that corresponding to the axial marginal end of the metal foil, and extends axially outward, up to the outward extremity of the rotary shaft.

By virtue of the construction of the present invention, all fear of metal-to-metal contact occurring between the axial marginal ends of the metal foil and the rotary shaft can be avoided, even when there exist working defects at the marginal ends of the metal foil or when the metal foil is expanded and deformed, thereafter, due to the axial pressure distriubtion characteristics of the gas layer in the bearing clearance. Consequently, perfect non-contact can be obtained over the entire surface of the metal foil, which ensures good performance suitable for a gas bearing usable for high speed rotation.

For a more complete understanding of the present invention, reference is made to the following detailed description and accompanying drawings. In the drawings like reference characters refer to like parts throughout the several views, in which:

DETAILED DESCRIPTION OF THE INVENTION

Figure 1:
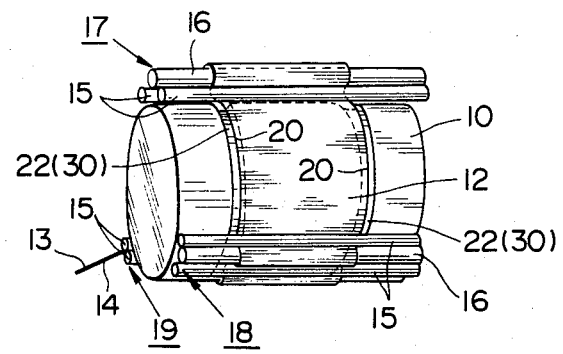
FIG. 1 is a perspective view showing a first embodiment of the present invention.

Referring now to the drawings, and, in particular, FIG. 1, there is depicted a first embodiment hereof wherein the present invention is applied to a tension type foil bearing. The bearing includes a rotary shaft 10 and a flexible metal foil 12.

A single sheet of metal foil 12 is stretched to contact and to threadingly proceed through passages defined by a first guide member 17 and a second guide member 18. Each guide member comprises a pair of guide pins 15 disposed parallel to the axis of the rotary shaft and a support pin 16. The foil 12 wraps the rotary shaft 10 and the two opposite end portions 13 and 14 are put together and passed through the pair of guide pins 15. The ends are fixed under tension imparted by a tensioning means (not shown).

Around the outer surface of the rotary shaft 10, a pair of annular grooves 22, of relatively small width, are circumferentially formed. Each groove is formed at a position corresponding to each axial end 20 of the metal foil 12. The width of each of the annular grooves is selected to have a suitable length, in an axial direction, having its middle point corresponding to respective axial ends 20 of the metal foil 12.

Figure 2:
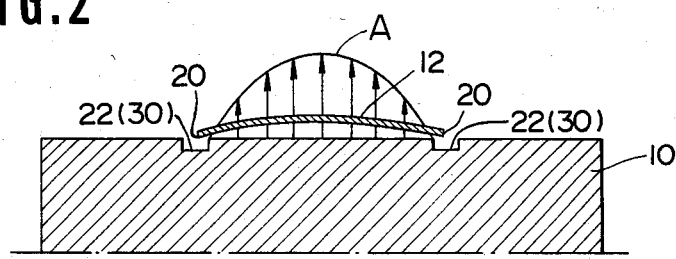
FIG. 2 is a sectional view showing the pressure distribution of the gas layer in the direction of the axis of the rotary shaft.

By virtue of this construction, the annular grooves 22 formed on the rotary shaft 10 constitute relief portions for avoiding undesirable contact of the metal foil 12 with the rotary shaft 10. Thus, there arises no possible chance of contact between the metal foil and the rotary shaft, even if the metal foil has any fabrication failure such as burring, warping or waving, which, ordinarily, are liable to be found in its axial ends. In essence these failures enter in the grooves.

Where the clearance between the metal foil 12 and the rotary shaft 10 is relatively small and there is applied a considerably large amount of load, pressure distribution of the gas layer formed within the clearance will follow the curvature as shown in FIG. 2, as a conical curve having a large cross-sectional curvature. Under such heavy load the metal foil 12 will bend radially and outwardly under the influence of the pressure of the gas layer. This will result in the axial end or ends of the metal foil 12 to approach the surface of the rotary shaft 10. However, even under this situation the axial ends 20 of the metal foil will enter in the annular groove 22 and prevent the foil from coming into contact with the rotary shaft.

The provision of the annular grooves 22 on the rotary shaft 10 may give rise to some difference in the manner of forming a gas layer from that when there is no annular groove. However, there arises little difference with respect to the axial pressure distribution of the gas layer. In addition, due to the fact that the metal foil 12 has considerable stiffness, any difference in the axial pressure distribution of the gas layer, if any, will not affect any appreciable influence on the metal foil 12.

Figure 3:
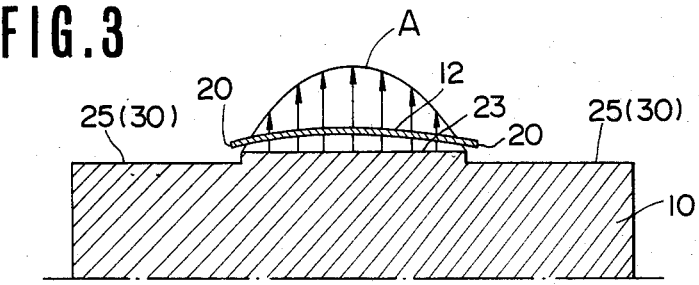
FIG. 3 is a sectional view depicting a second embodiment of the present invention, together with the pressure distribution of the gas layer in the axial direction.

FIG. 3 shows another embodiment of the present invention in which two opposite axial portions of a rotary shaft 10, each portion starting from a point axially and slightly inward to a point corresponding to the respective axial end of a metal foil 12 up to the axially outward extremity of the rotary shaft, have a reduced diameter 25. The reduced diameter 25 is smaller than the central portion 23 of the shaft 10 so as to let each portion 25 define a relief portion 30, for avoiding contact between the metal foil 12 and the rotary shaft 10.

Both of the faces, defining the steps between the central portion 23 and the reduced diameter portions 25,25 are positioned axially and slightly inwardly of the rotary shaft than the axial ends 20 of the metal foil 12. In this manner the axial length of the central portion 23 is shorter than the width of the metal foil 12.

Figure 4:
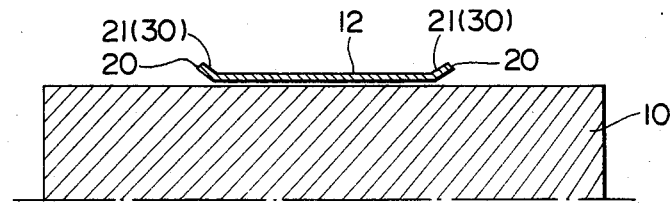
FIG. 4 is a sectional view showing still another embodiment of the present invention.

FIG. 4 show still another embodiment of the present invention, wherein the relief portions 30 for avoiding mutual contact between the rotary shaft 10 and the metal foil 12 are provided on the metal foil side.

Two opposite axial ends of a metal foil 12 are radially expanded to form a frusto-conical end portion 20 of enlarged diameter.

In each embodiment mentioned above, explanations have been made in the cases where the device of the present invention is applied to a tension-type foil bearing. But the present invention can, of course, be applied without being limited to the tension-type bearing. Thus, the present invention is applicable to other types of foil bearings such as multi-leaved bearing, hydrocele bearings, multi-ringed foil bearings, and so forth.

Having, thus, described the invention, what is claimed is:

1. A metal foil bearing comprising:
   a rotary shaft;
   a flexible metal foil wrapping said rotary shaft, the foil journally supporting a gas layer formed between said rotary shaft and said metal foil; and
   a pair of relief portions for preventing metal to metal contact between the foil and the shaft when the bearing is placed under a load, underlying opposing axial ends of said metal foil, formed on the bearing, wherein the foil is separated from the surface of the rotary shaft by a self-acting cushion of air between the foil and the shaft, the relief portion being formed between the outer surface of the rotary shaft and the inner surface of the coil, each relief portion extending axially outwardly from a point inwardly disposed from the overlying associated axial end of the metal foil.

2. The bearing of claim 1 wherein the relief portions are formed under each axial end of the foil around the rotary shaft on the outer surface thereof.

3. A metal foil bearing as claimed in claim 2, wherein said relief portions are a pair of frusto-conical portions, each formed by radially and outwardly expanding both axial end portions of said metal foil.

4. The bearing of claim 1 wherein the relief portions are formed on the outer surface of the rotary shaft, each relief portion extending from a point inwardly disposed from the overlying associated axial end of the metal foil up to the respective outer axial extremity of the rotary shaft.

5. A metal foil bearing as claimed in claim 1, wherein said relief portions comprise a pair of circumferential annular grooves, each groove being formed at a position corresponding to respective axial ends of said metal foil.

6. A metal foil bearing as claimed in claim 4, wherein each relief portion comprises a reduced diameter portion formed along the rotary shaft, each reduced diameter portion extending axially and outwardly from a point further in than the position corresponding to the axial end of said metal foil up to the axial end of said rotary shaft.

7. The bearing of claim 1 wherein opposing ends of the metal foil overlie a pair of relief portions formed around the rotary shaft on the outer surface thereof, wherein each relief portion comprises a circumferential groove of generally rectangular cross-section.

8. The bearing of claim 1 wherein
each relief portion further comprises a reduced diameter portion formed along the rotary shaft which extends axially and outwardly up to the axial end of the rotary shaft.

* * * * *